United States Patent
Jeong et al.

(10) Patent No.: US 9,516,525 B2
(45) Date of Patent: Dec. 6, 2016

(54) APPARATUS AND METHOD FOR TRANSMITTING/RECEIVING FEEDBACK INFORMATION IN A WIRELESS COMMUNICATION SYSTEM USING BEAMFORMING

(71) Applicant: Samsung Electronics Co., Ltd, Gyeonggi-do (KR)

(72) Inventors: Su-Ryong Jeong, Gyeonggi-do (KR); Hyun-Kyu Yu, Gyeonggi-do (KR); Cheol Jeong, Seoul (KR); Jeong-Ho Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 345 days.

(21) Appl. No.: 14/050,297

(22) Filed: Oct. 9, 2013

(65) Prior Publication Data

US 2014/0098695 A1    Apr. 10, 2014

(30) Foreign Application Priority Data

Oct. 9, 2012    (KR) .................... 10-2012-0111892

(51) Int. Cl.
*H04W 24/08*    (2009.01)
*H04L 1/00*    (2006.01)
(Continued)

(52) U.S. Cl.
CPC ........... *H04W 24/08* (2013.01); *H04B 7/0617* (2013.01); *H04B 7/0619* (2013.01); *H04L 1/0026* (2013.01); *H04L 1/20* (2013.01); *H04B 17/309* (2015.01)

(58) Field of Classification Search
CPC   H04B 17/309; H04B 17/318; H04B 17/336; H04B 7/0619; H04L 1/0026; H04W 24/08
USPC ...................................................... 370/252
See application file for complete search history.

(56) References Cited

U.S. PATENT DOCUMENTS

| 6,430,237 B1 * | 8/2002 | Anvari ............. H04B 7/08 375/343 |
| 2007/0002866 A1 | 1/2007 | Belstner et al. |

(Continued)

FOREIGN PATENT DOCUMENTS

| KR | 20070112932 A | 11/2007 |
| KR | 20110087191 A | 8/2011 |

(Continued)

OTHER PUBLICATIONS

International Search Report dated Jan. 13, 2014 in connection with International Patent Application No. PCT/KR2013/008980, 3 pages.

(Continued)

*Primary Examiner* — Habte Mered
*Assistant Examiner* — Rownak Islam

(57) ABSTRACT

An apparatus performs a method for generating information indicating channel quality when a dynamic range of a receive signal strength and an interference signal strength is considerable in a wireless communication system using beamforming. A base station (BS) for processing feedback information for scheduling receives from a mobile station (MS) first feedback information comprising a receive signal strength measurement result in paths selected from a plurality of downlink paths between the BSs and the MS, designates a transmit (TX) resource for interference measurement of the MS based on the first feedback information, receives from the MS second feedback information comprising an interference measurement result in the designated TX resource region, and calculates a Signal to Interference plus Noise Ratio (SINR) of the MS based on the first feedback information and the second feedback information. The designated TX resource includes a resource other than a signal TX resource for the MS.

24 Claims, 12 Drawing Sheets

(51) Int. Cl.
*H04L 1/20* (2006.01)
*H04B 7/06* (2006.01)
*H04B 17/309* (2015.01)

(56) References Cited

U.S. PATENT DOCUMENTS

| | | | |
|---|---|---|---|
| 2007/0097981 A1* | 5/2007 | Papasakellariou | H04L 1/1854 370/394 |
| 2010/0323739 A1* | 12/2010 | Wan | H04L 1/0026 455/513 |
| 2011/0211468 A1 | 9/2011 | Zhang et al. | |
| 2011/0211487 A1* | 9/2011 | Han | H04W 16/28 370/252 |
| 2012/0114028 A1* | 5/2012 | Davydov | H04B 7/024 375/224 |
| 2012/0122392 A1* | 5/2012 | Morioka | H04B 7/0695 455/25 |
| 2012/0176996 A1* | 7/2012 | Kim | H04W 72/0413 370/329 |
| 2012/0315859 A1* | 12/2012 | Lee, II | H04J 11/005 455/67.13 |
| 2013/0094387 A1* | 4/2013 | Susitaival | H04W 72/085 370/252 |
| 2013/0242769 A1* | 9/2013 | Hammarwall | H04L 5/0016 370/252 |
| 2013/0286881 A1* | 10/2013 | Ding | H04W 8/24 370/252 |

FOREIGN PATENT DOCUMENTS

| | | |
|---|---|---|
| KR | 10-2011-0033331 | 4/2012 |
| WO | WO 2012/072101 A1 | 6/2012 |

OTHER PUBLICATIONS

Written Opinion of International Searching Authority dated Jan. 13, 2014 in connection with International Patent Application No. PCT/KR2013/008980, 6 pages.
Extended European Search Report dated May 30, 2016 in connection with European Application No. 13844609.1, 8 pages.

* cited by examiner

APPARATUS AND METHOD FOR TRANSMITTING/RECEIVING FEEDBACK INFORMATION IN A WIRELESS COMMUNICATION SYSTEM USING BEAMFORMING

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Oct. 9, 2012 and assigned Serial No. 10-2012-0111892, the entire disclosure of which is hereby incorporated by reference.

TECHNICAL FIELD

The present disclosure relates generally to a wireless communication system. More particularly, the present disclosure relates to transmission/reception of feedback information for scheduling in the wireless communication system using beamforming.

BACKGROUND

To meet a continuously increasing demand for wireless data traffic, wireless communication systems are advancing to supporting a higher data rate. A $4^{th}$ Generation (4G) system currently commercialized mostly seeks to enhance spectral efficiency in order to increase the data rate. However, it is not easy to meet the sharply increasing demand for the wireless data traffic merely with spectral efficiency enhancements.

One solution for meeting the wireless data traffic demand uses a very wide frequency band. Since current mobile communication cellular systems generally use the frequency band below 10 GHz, it is quite difficult to secure the wide frequency band. Hence, it is necessary to secure broadband frequencies in the higher frequency band. For example, introduction of a millimeter wave (mm wave) system is under discussion to secure the wide frequency band. However, as the frequency for the wireless communication increases, a propagation path loss also increases. As a result, a propagation distance is relatively shortened and service coverage shrinks. Key techniques for mitigating the propagation path loss and extending the propagation distance include a beamforming technique.

A conventional cellular system uses Channel Quality Information (CQI) for scheduling. The CQI is feedback information provided by a mobile station to a base station by measuring receive channel quality. For example, the CQI includes a Signal to Interference plus Noise Ratio (SINR). It is appropriate to use the CQI of the SINR type as the scheduling information when a dynamic range of the receive signal strength and an interference signal strength is not considerable. However, in wireless communication systems using beamforming, it is inadequate to use the CQI of the SINR type measured by the mobile station as the feedback information for the scheduling because the dynamic range of the receive signal strength and the interference signal strength is considerable based on TX/RX beamforming. Thus, what is needed is adequate CQI as the feedback information for the scheduling in the wireless communication system using beamforming.

SUMMARY

To address the above-discussed deficiencies of the prior art, it is a primary aspect of the present disclosure to provide adequate CQI for scheduling in a wireless communication system using beamforming.

Another aspect of the present disclosure is to provide an apparatus and a method for generating information indicating channel quality when a dynamic range of a receive signal strength and an interference signal strength is considerable in a wireless communication system using beamforming.

According to one aspect of the present disclosure, a method of a first Base Station (BS) of BSs for processing feedback information for scheduling in a wireless communication system that uses beamforming and comprises the BSs and a Mobile Station (MS) in coordinated communication is provided. The method includes receiving from the MS first feedback information comprising a receive signal strength measurement result in paths selected from a plurality of downlink paths between the BSs and the MS, designating a TX resource for interference measurement of the MS based on the first feedback information, receiving from the MS second feedback information comprising an interference measurement result in the designated TX resource region, and calculating a Signal to Interference plus Noise Ratio (SINR) of the MS based on the first feedback information and the second feedback information. The designated TX resource includes a resource other than a signal TX resource for the MS.

According to another aspect of the present disclosure, a method of a MS for providing feedback information for scheduling to a first BS of BSs in a wireless communication system that uses beamforming and comprises the BSs and the MS in coordinated communication is provided. The method includes transmitting to the first BS first feedback information comprising a receive signal strength measurement result in paths selected from a plurality of downlink paths between the BSs and the MS, receiving a TX resource allocated for interference measurement of the MS and designated by the first BS based on the first feedback information, and transmitting to the first BS second feedback information comprising an interference measurement result in the designated TX resource region so that the first BS calculates a SINR of the MS based on the first feedback information and the second feedback information. The designated TX resource includes a resource other than a signal TX resource for the MS.

According to yet another aspect of the present disclosure, an apparatus of a first BS of BSs for processing feedback information for scheduling in a wireless communication system that uses beamforming and comprises the BSs and a MS in coordinated communication is provided. The apparatus includes a feedback information receiver configured to receive from the MS first feedback information comprising a receive signal strength measurement result in paths selected from a plurality of downlink paths between the BSs and the MS, and second feedback information comprising an interference measurement result in the designated TX resource region, and a scheduler configured to designate a TX resource for interference measurement of the MS based on the first feedback information, and calculate a SINR of the MS based on the first feedback information and the second feedback information. The designated TX resource includes a resource other than a signal TX resource for the MS.

According to still another aspect of the present disclosure, an apparatus of a MS for providing feedback information for scheduling to a first BS of BSs in a wireless communication system that uses beamforming and comprises the BSs and the MS in coordinated communication is provided. The apparatus includes a receive signal strength measurer configured to measure a receive signal strength in paths selected from a plurality of downlink paths between the BSs and the MS, an information transmitter configured to receive a TX resource designated by the first BS for interference measurement of the MS based on the first feedback information comprising the receive signal strength measurement result, and a transmitter configured to transmit to the first MS the first feedback information and second feedback information comprising the interference measurement result in the designated TX resource region so that the first BS calculates a SINR of the MS based on the first feedback information and the second feedback information. The designated TX resource includes a resource other than a signal TX resource for the MS.

Other aspects, advantages, and salient features of the disclosure will become apparent to those skilled in the art from the following detailed description, which, taken in conjunction with the annexed drawings, discloses example embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
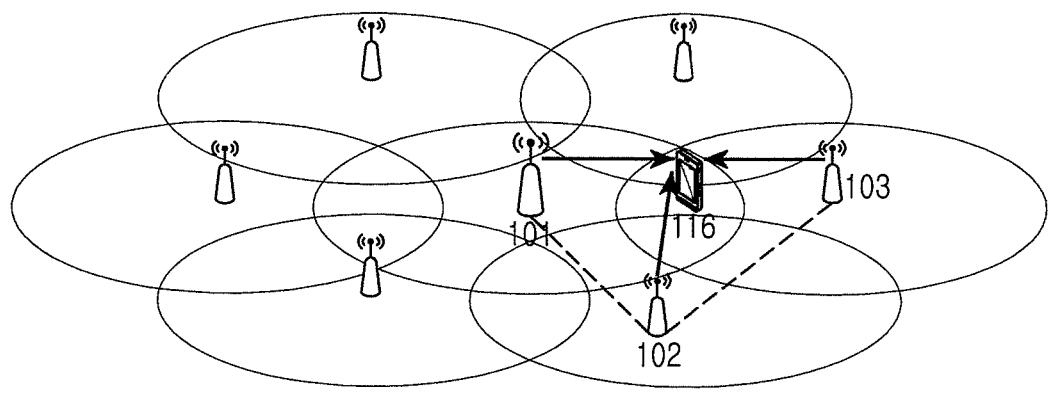
FIG. 1 illustrates Coordinated Multi-Point (CoMP) communication in a wireless network according to an embodiment of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. The following description with reference to the accompanying drawings is provided to assist in a comprehensive understanding of example embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of example embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. A known method, procedure, component, and circuit may be described not in detail so that an unnecessary difficulty in understanding the embodiments of the present disclosure can be prevented.

Example embodiments of the present disclosure provide new Channel Quality Information (CQI) suitable for scheduling when a dynamic range of a receive signal strength and an interference signal strength is considerable in a wireless communication system using beamforming.

Hereinafter, the beamforming technique, a wireless network using beamforming, and a Coordinated Multi-Point communication (CoMP) technique applied to the wireless network using beamforming are elucidated. Next, principles of example embodiments of the present disclosure shall be explained in brief. Next, the example embodiments of the present disclosure shall be explained in detail.

<Beamforming and CoMP>

The beamforming technique, which extends a propagation distance, includes transmit (TX) beamforming and receive (RX) beamforming. TX beamforming focuses a propagation area in a particular direction using a plurality of antennas at a transmitting end. In so doing, the set of antennas is referred to as an antenna array, and each individual antenna of the antenna array is referred to as an array element. TX beamforming can not only extend a signal transmission distance but also mitigate interference of a neighboring cell because a signal transmitted in a direction other than the corresponding direction decreases in strength. RX beamforming, which is applied to the antenna array of a receiving end, can extend a reception distance of the corresponding signal by focusing the reception area of the propagation in a particular direction, and cancel the interference of the neighboring cell by reducing a receive gain of the signal transmitted in other directions.

As such, TX/RX beamforming can increase the signal strength and cancel the interference, to thus improve a Signal to Interference plus Noise Ratio (SINR) of the received signal. Hence, TX/RX beamforming is considered as a crucial feature in a next communication system.

The technique for artificially improving the receive signal using coordination between Base Stations (BSs) in a multi-BS environment is referred to as CoMP. CoMP includes a method for allocating Mobile Station (MS) or adjusting the TX beam of the MS to cancel the mutual interference.

In particular, since a wireless communication system using beamforming can reject the interference with the beamforming, a good signal can be received even from a neighboring BS, not a serving BS. A combination of this characteristic and the CoMP technique can not only find the best signal in selective signal paths (combinations of the TX beams of the BSs and the RX beams of the MSs) from the BSs, but also use the signal path for easily avoiding the mutual interference. Finally, the receive SINR of the MSs can be improved and a system capacity can be increased.

Such methods include a Coordinated Scheduling (CS)/Coordinated Beamforming (CB) and Dynamic transmission Point Selection (DPS). CS/CB can find the combination of the least mutual interference through CoMP and information sharing and thus allocate the MSs to the BSs. The DPS can find and optimize the path of the best signal strength among the BSs including the serving BS through CoMP and the information sharing and thus allocate the MSs to the BSs. CoMP may allow one or more BSs to transmit the same signal to one MS. As such, CoMP techniques can enhance communication quality using CoMP.

FIG. 1 depicts the CoMP of BSs in a wireless network according to an embodiment of the present disclosure. As shown in FIG. 1, BSs 101, 102, and 103 reside around a MS 116. MS 116 can, if necessary, transmit and receive signals to and from the BSs 101, 102, and 103, and conduct scheduling by considering mutual interference. Hereafter, it is assumed that the BS 101 has priority to control MS 116.

When BSs 101, 102, and 103 schedule the MS to be allocated to a particular frame in the CoMP system as shown in FIG. 1, the MS and the beam are allocated to make the best signal received at the MS 116 and to minimize the interference of the adjacent MSs.

To allocate the MS and to determine a Modulation and Coding Scheme (MSC) of the frame, a conventional wireless communication system without the beamforming utilizes the CQI measured by the MS through reference channel reception. For example, SINR information of Equation 1 can be used.

$$SINR = \frac{P_s}{\sum_{k=0,k \neq s}^{K-1} P_k + P_n} \quad \text{[Eqn. 1]}$$

In Equation 1, $P_s$ denotes the receive signal strength from the serving BS s, $P_k$ denotes the interference signal strength from the k-th BS (k is not the serving BS s), and $P_n$ denotes a noise power.

However, in the wireless communication system using beamforming, the single SINR measured by the MS over a certain reference channel is merely the SINR of a particular TX beam of the serving BS and a particular TX beam of the interfering BS, and the TX beam of the BS varies for every transmission. Hence, such an SINR value may be inaccurate or inadequate for the scheduling or the signal quality. More specifically, Equation 1 can be modified to Equation 2 by applying the TX beamforming.

$$SINR = \frac{P_s(v_s)}{\sum_{k=0,k \neq s}^{K-1} P_k(v_k) + P_n} \quad \text{[Eqn. 2]}$$

In Equation 2, $P_s(v_s)$ denotes the receive signal strength of the MS when the serving BS s transmits the signal using a beamforming vector $v_s$, $P_k(v_k)$ denotes the interference signal strength of the MS when the k-th BS (k is not the serving BS s) transmits the signal using a beamforming vector $v_k$, and $P_n$ denotes the noise power. The vector may denote a particular TX beam direction.

As expressed in Equation 2, $P_s$ can have a different receive strength according to the TX beamforming vector or direction $v_s$ of the serving BS, and the interference signal strength from the interfering BS can also vary according to the TX beamforming vector or direction. Thus, the SINRs also vary and the conventional single CQI value cannot represent the TX channel quality. In particular, beam allocation information of the neighboring BS can be shared in advance when the CoMP is applied, and used for the scheduling or the MCS level determination. The single value of Equation 1 cannot appropriately reflect the beam allocation information of the neighboring BS.

To address this shortcoming, the MS provides the BS with the receive signal strength of N-ary signal paths (the combination of the BS TX beam and the MS RX beam) of the strongest signal strength or the signal paths of the receive strength over a certain threshold as first feedback information Pstrong, instead of the conventional CQI of the SINR type.

The present disclosure provides a method for defining and calculating a parameter Pweak in the MS or the BS. The present disclosure also provides a method of the MS for calculating and reporting Pweak to the BS. The present disclosure further provides a method of the BS for defining Pinst to be received from the MS in order to calculate Pweak.

The SINR usable in the beamforming and CoMP environment is defined as Equation 3.

$$SINR = \frac{Pstrong_{desired}}{\sum_{s} Pstrong + Pweak + Pn} \qquad [\text{Eqn. 3}]$$

Figure 2:
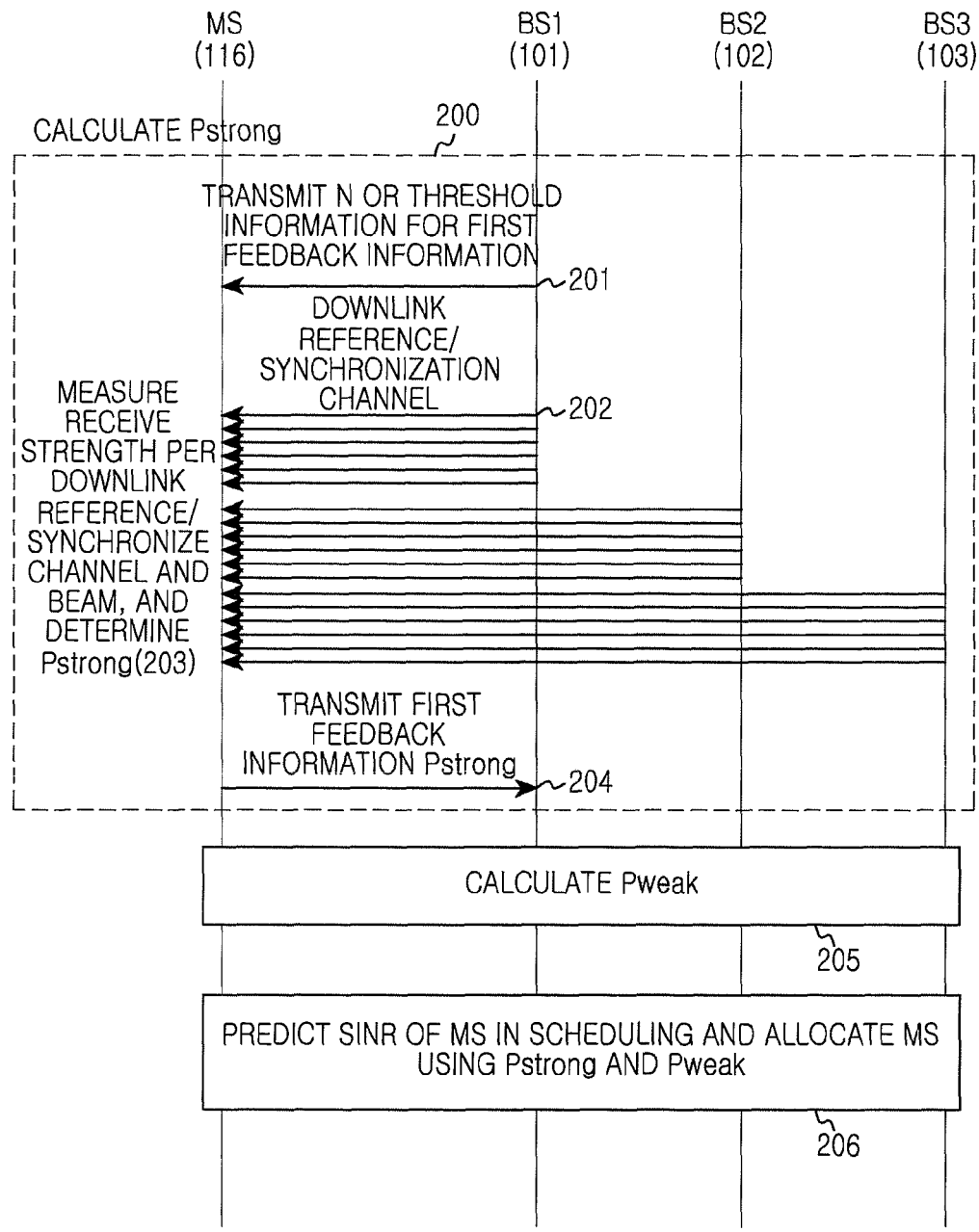
FIG. 2 illustrates transmission and reception between a base station and a mobile station for processing feedback information according to an embodiment of the present disclosure.

FIG. 2 illustrates transmission and reception between the BS and the MS for processing the feedback information according to an embodiment of the present disclosure. FIG. 2 corresponds to system operations applying Equation 3.

Figure 3:
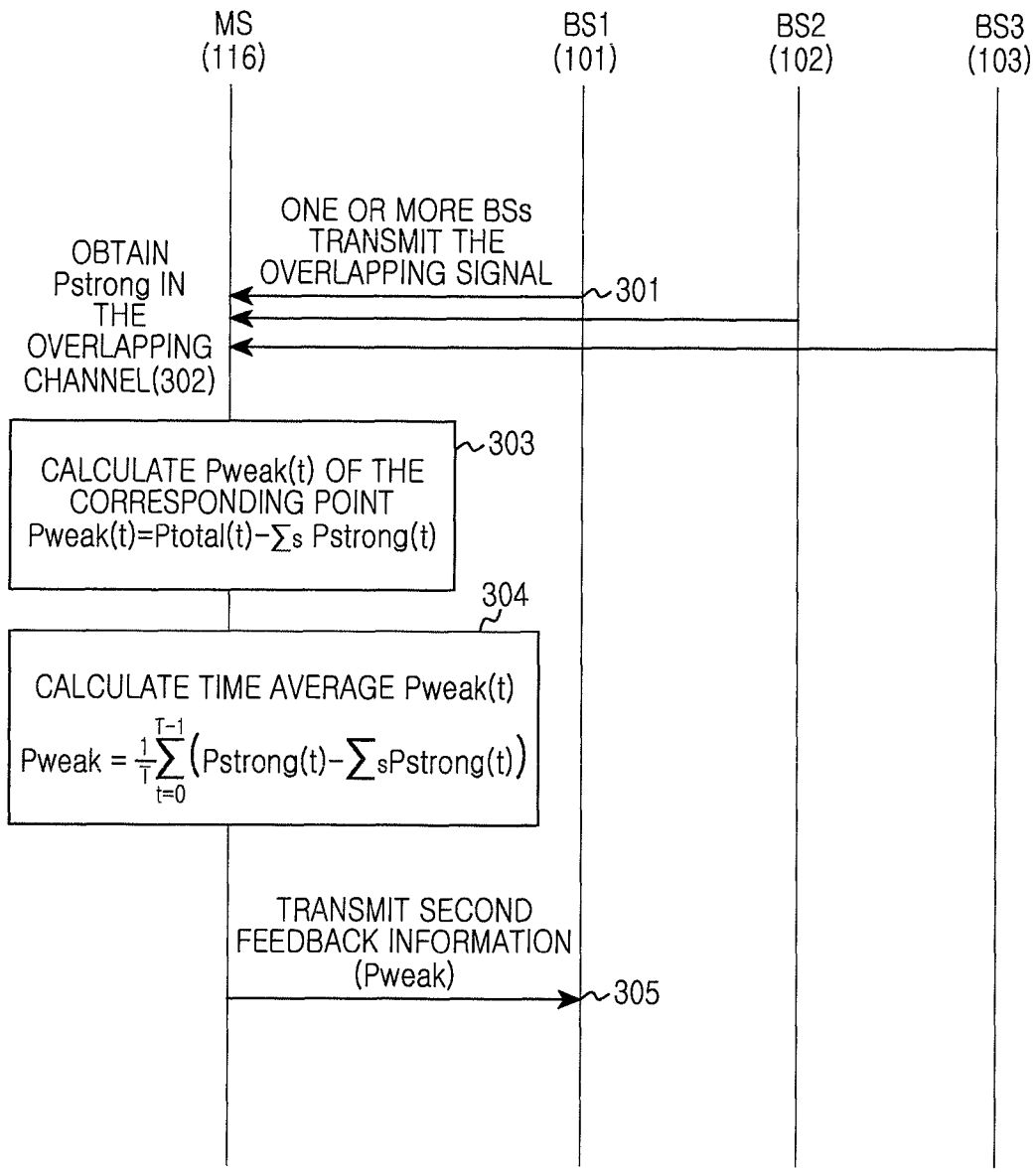
FIG. 3 illustrates calculation of operation 205 of FIG. 2.
Figure 5:
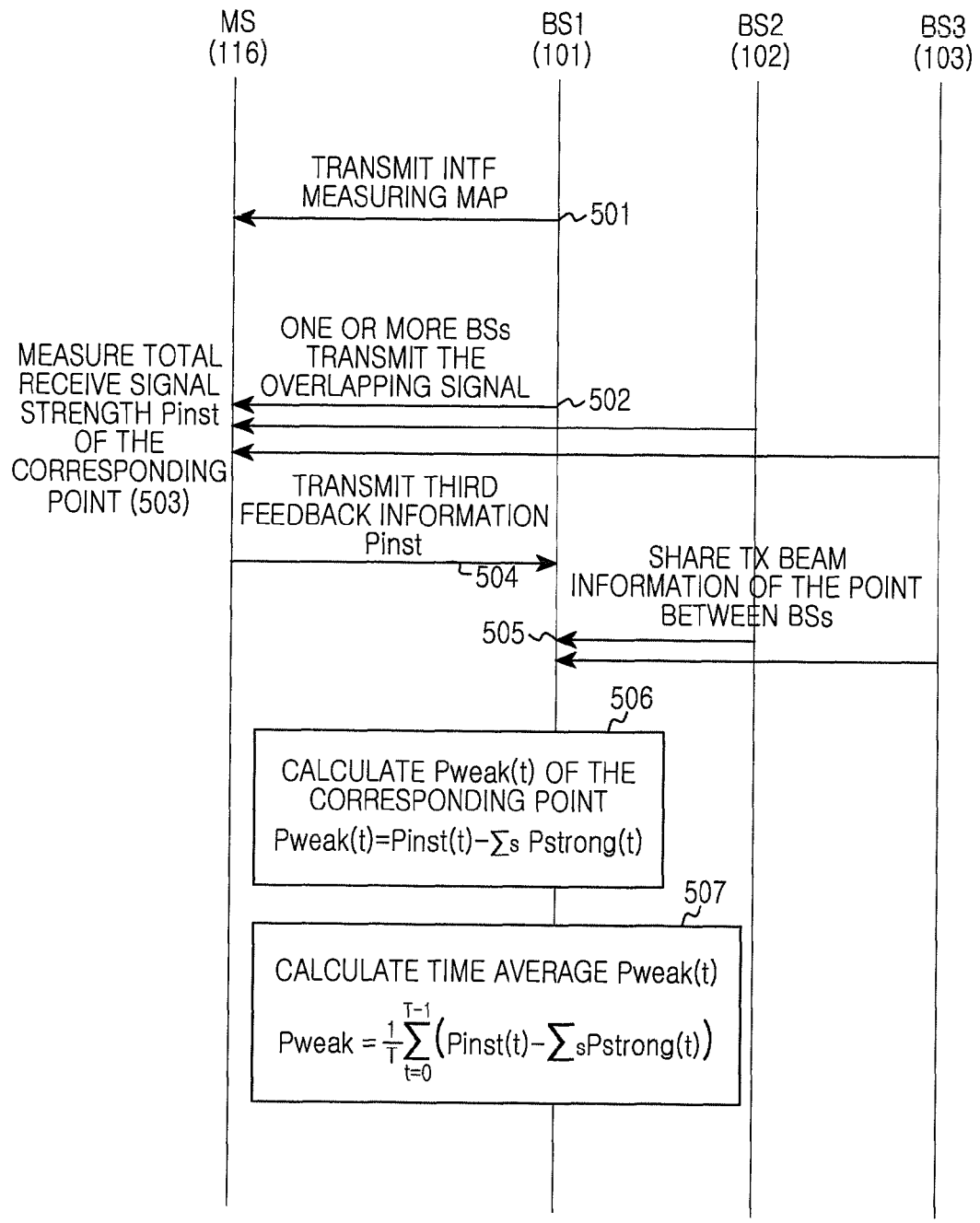
FIG. 5 illustrates another calculation of operation 205 of FIG. 2.

Referring to FIG. 2, the transmission and reception can be divided largely into three processes. In the first process, the MS calculates, transmits, and reports Pstrong to the BS in operation 200. The second process calculates Pweak in operation 205, which can be carried out by the MS as shown in FIG. 3 or the BS as shown in FIG. 5. In the third process, the BS predicts the SINR of the MS and allocates the MSs in the scheduling by use of the collected Pstrong and Pweak in operation 206.

In operation 201 of operation 200, the BSs 101, 102, and 103 transmit control information for first feedback information Pstrong to the MSs of the CoMP among MSs 116 belonging to the corresponding BS. Herein, the first feedback information indicates a signal Pstrong, and an index Pstrong indicates the signal path of relatively high value and its receive strength among downlink signal paths (combinations of the BS TX beams and the MS RX beams) from one or more BSs and the TX beams of the BS measured by a particular MS over a downlink reference channel. The BS uses Pstrong for the scheduling for the CoMP and thus predicts the SINR of a particular MS according to the transmission type per BS. More specifically, Pstrong is the receive strength of the reference channel for each downlink signal path measured by the MS. When the corresponding receive strength is relatively high, the MS selects Pstrong and reports information of Pstrong to the BS.

As such, in operation 201, the BS transmits the control information so that the MS can determine the relatively high values. Based on the control information, the MS determines the first feedback information Pstrong in operation 203. In so doing, the control information of the first feedback information Pstrong can include particular threshold information for the MS to determine the relatively high values, or a numeral N indicating a particular number, or threshold information and number information N.

When the corresponding information is a particular threshold, the MS receiving the information measures the path signal strength of the downlink reference channel or a synchronization channel in operation 202, and determines Pstrong by measuring the receive strengths of the signal path exceeding the corresponding threshold in operation 203. When the corresponding information is the numeral N indicating the particular number, the MS receiving the information measures the path signal strength of the downlink reference channel or the synchronization channel in operation 202, and determines Pstrong by measuring the strengths of the N-ary signal paths in descending order starting from the signal path of the greatest signal strength in operation 203. When the corresponding information includes both of the particular threshold and the numeral N indicating the number, the MS receiving the information determines Pstrong by measuring the receive strengths up to the N-ary signal paths in descending order of the signal paths exceeding the corresponding threshold in operation 203.

The MSs measuring the signal path of Pstrong and its signal strength, report the corresponding values to the BS in operation 204 so as to send the information Pstrong to the BS. The feedback information reported in operation 204 includes the signal receive strength Pstrong, a BS (cell/sector) ID, a TX beam ID, and a RX beam ID as shown in Table 1.

Operation 205 calculates Pweak, which may be carried out by the MS as shown in FIG. 3 or the BS as shown in FIG. 5.

In operation 206, the BS predicts the SINR of the MS for the scheduling by utilizing the information Pstrong collected in operation 204 and Pweak calculated in operation 205, and thus allocates the MSs. How the BS receiving the information Pstrong predicts the SINR of the MS is explained based on Table 1.

TABLE 1

| Base Station (cell/sector) ID | Transmitting Beam ID | Receiving Beam ID of Mobile Station | Signal Receive strength |
|---|---|---|---|
| BS1 | #1 | #1 | P1 |
| BS1 | #2 | #1 | P2 |
| BS2 | #5 | #1 | P3 |
| BS3 | #10 | #2 | P4 |
| BS1 | #3 | #2 | P5 |
| BS3 | #11 | #1 | P6 |
| BS4 | #15 | #1 | P7 |
| BS1 | #4 | #2 | P8 |
| BS1 | #5 | #2 | P9 |
| BS3 | #12 | #1 | P10 |

When BS1, which is one of the BSs receiving the feedback information of Table 1 and the BS of the CoMP, allocates the corresponding MS over the first TX beam, the MS receives the signal over the RX beam #1. In so doing, the corresponding signal receive strength is predicted as P1. The corresponding signal P1 is the signal for the corresponding MS and thus defined as $Pstrong_{desired}$.

For the signal P1 received, the major beams can interfere in the MS when the MS RX beam ID is #1 as shown in Table 1. Pstrong causing the interference sources can be rearranged as shown in Table 2.

TABLE 2

| Base Station (cell/sector) ID | The Allocated Transmitting Beam ID | Receiving Beam ID of Mobile Station | Signal Receive strength |
|---|---|---|---|
| BS1 | #1 | #1 | P1 |
| BS1 | #2 | #1 | P2 |
| BS2 | #5 | #1 | P3 |
| BS3 | #11 | #1 | P6 |
| BS4 | #15 | #1 | P7 |
| BS3 | #12 | #1 | P10 |

On the assumption that BS2 allocates the TX beam #5, BS3 allocates the TX beam #11, BS4 allocates the TX beam #16 and BS5 allocates the TX beam #1 according to the beam allocation information received from the neighboring BSs, the beams (i.e., #16 of BS4 and #1 of BS5) not included in Pstrong but actually allocated, excluding the unallocated beams (i.e., the TX beam ID #2, #15, and #12) for Pstrong of Table 2 can be rearranged as shown in Table 3.

TABLE 3

| Base Station (cell/sector) ID | Transmitting Beam ID | The Corresponding Receiving Beam ID of Mobile Station | Signal/Interference strength |
| --- | --- | --- | --- |
| BS1 | #1 | #1 | P1(Signal)/Pstrong$_{desired}$ |
| BS2 | #5 | | P3(interference) |
| BS3 | #11 | | P6(interference) |
| BS4 | #16 | | No Receive Strength Information/Pweak |
| BS5 | #1 | | No Receive Strength Information/Pweak |

When the corresponding beam belonging to Pstrong is allocated, the allocated beam is defined as Pstrong$_{desired}$ of Equation 3 as a serving signal. The sum of the beams belonging to Pstrong other than Pstrong$_{desired}$ and allocated to the corresponding point is defined as $$\sum_{s} Pstrong$$

in Equation 3, which corresponds to P3 and P6.

The TX beams #16 and #1 of BS4 and BS5 do not correspond to Pstrong reported by the MS. Since it is difficult for the MS to measure the individual signal receive strength and the corresponding values also vary in every transmission, their accurate prediction is infeasible. Yet, their sum is not insignificant and thus a method for measuring the values may be required. Herein, the corresponding time average is defined as Pweak. Its detailed measurement can be fulfilled as shown in FIG. 3 or FIG. 5, explained below.

When the values of Table 2 are applied to Equation 3, Equation 3 can be modified to Equation 4.

$$SINR = \frac{P1}{P3 + P6 + Pweak + Pn} \quad [\text{Eqn. 4}]$$

In Equation 4, upon obtaining only the information Pweak aside from the information Pstrong, the BS can predict the SINR of the corresponding MS. The BS can obtain Pweak using two methods as described in operation 205 of FIG. 2. According to the first method, the MS directly measures and reports Pweak to the BS. According to the second method, the MS measures the whole receive signal strength of the frame indicated by the BS and reports the corresponding value to the BS, and the BS obtains Pweak using the reported value. The first method is shown in FIG. 3 and the second method is shown in FIG. 5.

FIG. 3 depicts the detailed Pweak calculation of operation 205 of FIG. 2.

In operation 301, BSs 101, 102, and 103 transmit their BS signal such as reference channel signal. In operation 302, MS 116 receives the one or more overlapping BS signals and identifies the signals corresponding to Pstrong among the one or more overlapping BS signals. The reference channel generally includes unique sequences for the BS and the TX beam. Since the signals corresponding to Pstrong are assumed to exhibit sufficiently good receive strength, their sequence can be decoded. Hence, MS 116 can obtain the signals Pstrong of the corresponding receive signal by decoding the sequences.

Alternatively, when it is difficult to decode the sequence as above, the BS may inform the MS of the TX beam information per BS transmitted from the neighboring BSs in advance so that the MSs can identify the signals corresponding to Pstrong with respect to the channel of the one or more overlapping BS signals.

Figure 4:
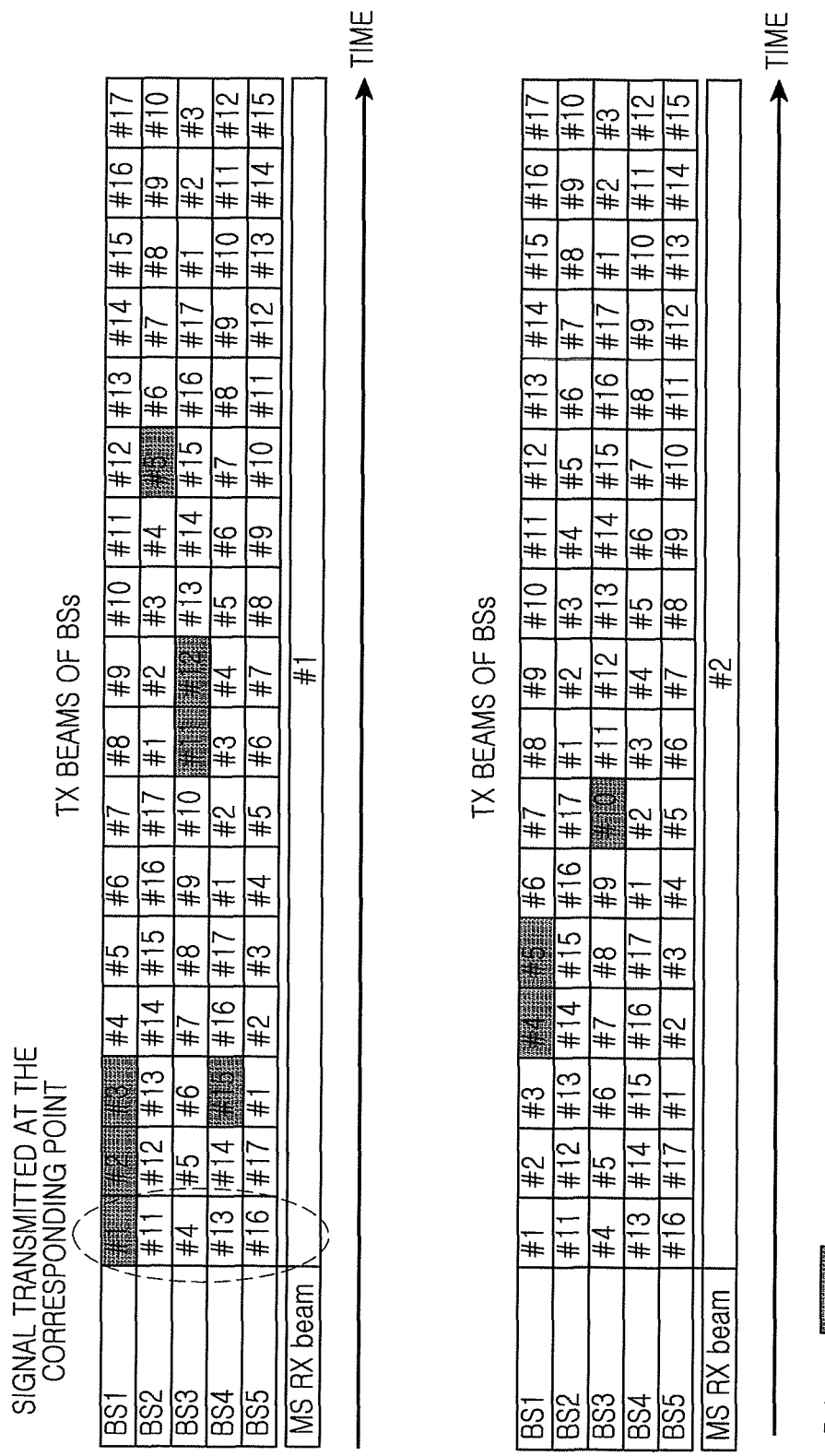
FIG. 4 illustrates calculation of operation 303 of FIG. 3.

In operation 303, the MS 116 calculates Pweak at the corresponding point using Pstrong obtained in operation 302, which shall be described in more detail by referring to FIG. 4.

In FIG. 4, the point corresponding to the dotted circle (that is, the point where BS1 through BS5 transmit the signals #1, #11, #4, #13, and #16) is explained by way of example. The MS measures a total signal strength Ptotal of this point. When the TX beam of the corresponding frame includes the signal (e.g., #1) corresponding to Pstrong, this signal is excluded from the total signal strength. In so doing, when the signal value Pstrong of the corresponding frame cannot be measured from the corresponding frame, it can be replaced with the measured value; that is, the Pstrong information transmitted to the BS as shown in Table 1. Based on Table 1, the beam #1 of BS1 at the corresponding point of FIG. 4 is Pstrong. Hence, the value Pweak of the corresponding point is the value excluding P1 of Table 1 corresponding to Pstrong from Ptotal, which is expressed in Equation 5.

$$Pweak(t) = Ptotal(t) - \sum_{s} Pstrong(t) \quad [\text{Eqn. 5}]$$

In Equation 5, Ptotal(t) denotes the total receive strength of the MS at a particular point t, and $$\sum_{s} Pstrong(t)$$

denotes the sum when the set of the beams corresponding to Pstrong allocated at the corresponding point is S. Pweak(t) of the corresponding point is produced by subtracting the sum of the beam strengths corresponding to Pstrong allocated at the corresponding point t from the total receive strength of the particular point t in Equation 5.

To facilitate the understanding of Equation 5, on assumption that the signals of FIG. 4 are transmitted, Equation 5 can be replaced with Equation 6.

$$Pweak(t) = (P_{BS1\#1}(=P1) + P_{BS2\#11} + P_{BS3\#4} + \quad [\text{Eqn. 6}]$$
$$P_{BS4\#13} + P_{BS5\#16}) - P_{BS1\#1}(=P1)$$
$$= P_{BS2\#11} + P_{BS3\#4} + P_{BS4\#13} + P_{BS5\#16}$$

The calculated Pweak is instantaneous. Hence, to raise its accuracy, Pweak is determined by calculating its time average, which is expressed as Equation 7.

$$Pweak = \frac{1}{T} \sum_{t=0}^{T-1} \left( Ptotal(t) - \sum_{s} Pstrong(t) \right) \quad [\text{Eqn. 7}]$$

Referring back to FIG. 3, the MS calculates Pweak based on Equation 7 in operation 304 and transmits the calculated Pweak, as second feedback information, to the BS in operation 305.

The BS, which obtains all of the values of Equation 3 or Equation 4 including the corresponding Pweak, can predict the SINR of the corresponding MS in the CoMP environment.

FIG. 5 depicts another calculation of operation 205 of FIG. 2.

In operation 501, BS 101 transmits an Interference (INTF) measuring MAP signal to the MS or a MS group associated with measuring Pweak. Herein, the INTF measuring MAP is a signal indicating a resource for measuring the total signal receive strength for the MSs receiving the INTF measuring MAP. The INTF measuring MAP signal includes information of the MS or the MS group for measuring the INTF, and information of the resource location to be measured by the corresponding MS or MS group. In addition, when the MSs apply the RX beamforming, the INTF measuring MAP signal may include a direction/pattern of the RX beamforming to be used by the corresponding MS to measure the sum of the corresponding interference signals.

Figure 6:
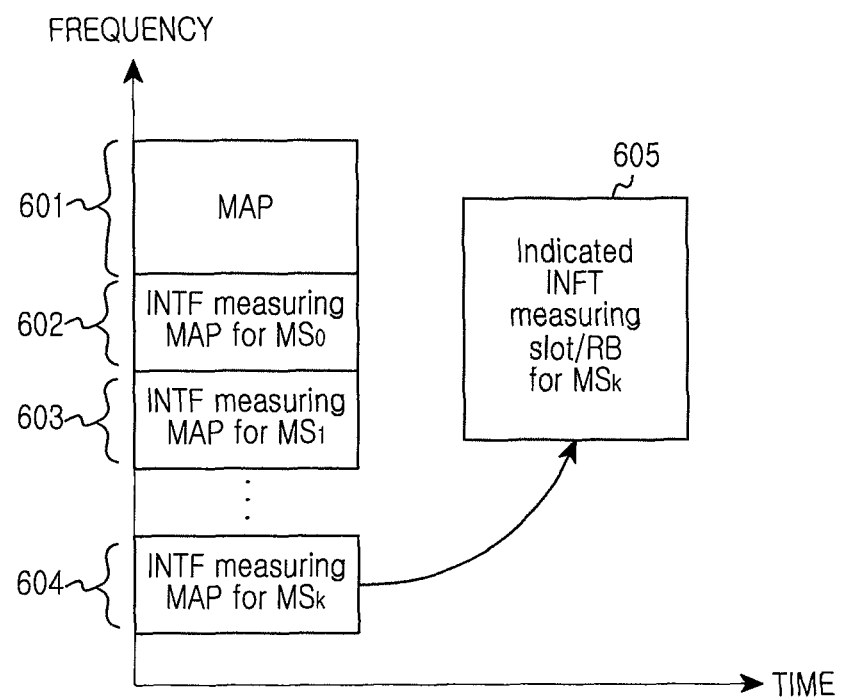
FIG. 6 illustrates interference measuring resource information transmitted in operation 501 of FIG. 5.

FIG. 6 depicts the INTF measuring resource information transmitted in operation 501 of FIG. 5.

In FIG. 6, a signal 601 indicates a conventional MAP signal and signals 602, 603, and 604 indicate the INTF measuring MAP of the present disclosure. The INTF measuring MAP includes the designated MS or MS group, and the resource location to be measured by the designated MS or MS group. For example, the signal 604 of the INTF measuring MAP, which is a control signal for a k-th MS MSk, controls the MSk to measure the interference at the resource location indicated by the signal 605. If necessary, the INTF measuring MAP information can further include an index of the RX beam direction or pattern to be used by the corresponding MS to measure the interference. The designated INTF measuring resource, which is solely for the signal strength measurement, may not be a data region for the corresponding region and can be a resource region for other MSs irrelevant to the corresponding MS.

Referring back to FIG. 5, MS 116 receiving the INTF measuring MAP signal receives the one or more overlapping BS signals in operation 502. MS 116 measures the sum Pinst of the total signal strength using the designated RX beam direction in operation 503, and transmits the measured signal strength Pinst, as third feedback information, to BS 101 in operation 504.

In operation 505, BS 101 receiving the third feedback information obtains from the other BSs 102 and 103, beam information used by the BS for the transmission with respect to the resource corresponding to the previous INTF measuring MAP. In so doing, BS 101 already obtains the information Pstrong of the MSs in operation 200 of FIG. 2 and obtains the beam allocation information of the BSs at the corresponding point in operation 505. Accordingly, BS 101 can obtain the signal used by the BS and corresponding to Pstrong of the corresponding MS and the sum with respect to the resource corresponding to the previous INTF measuring MAP. In operation 506, BS 101, which is reported about the total receive signal strength Pinst of MS 116 for the resource corresponding to the INTF measuring MAP in operation 504, calculates Pweak of the resource designated by the corresponding INTF measuring MAP by excluding the receive strength sum of the signals corresponding to Pstrong of the corresponding MS from the corresponding Pinst, which is expressed as Equation 8.

$$Pweak(t) = Pinst(t) - \sum_s Pstrong(t) \qquad \text{[Eqn. 8]}$$

In operation 507, if necessary, BS 101 can enhance the accuracy of the corresponding value by repeatedly obtaining Pinst and measuring the average, which can be expressed as Equation 9.

$$Pweak = \frac{1}{T}\sum_{t=0}^{T-1}\left(Pinst(t) - \sum_s Pstrong(t)\right) \qquad \text{[Eqn. 9]}$$

Referring back to FIG. 2, BS 101 can obtain Pweak by receiving the information corresponding to Pstrong of the MSs in operation 204 and receiving Pinst from the MSs in operation 205 (see FIG. 3) or Pinst for estimating Pweak (see FIG. 5). BS 101 can finally apply Equation 3 with the reported values. In operation 206, BS 101 can predict the SINR reflecting the TX beams of the neighboring BSs with respect the corresponding MS based on Equation 3. The predicted SINR can be applied to the scheduling and the MS level of the MS.

The above-stated operations of the BS and the MS are depicted in FIGS. 7 through 10.

Figure 7:
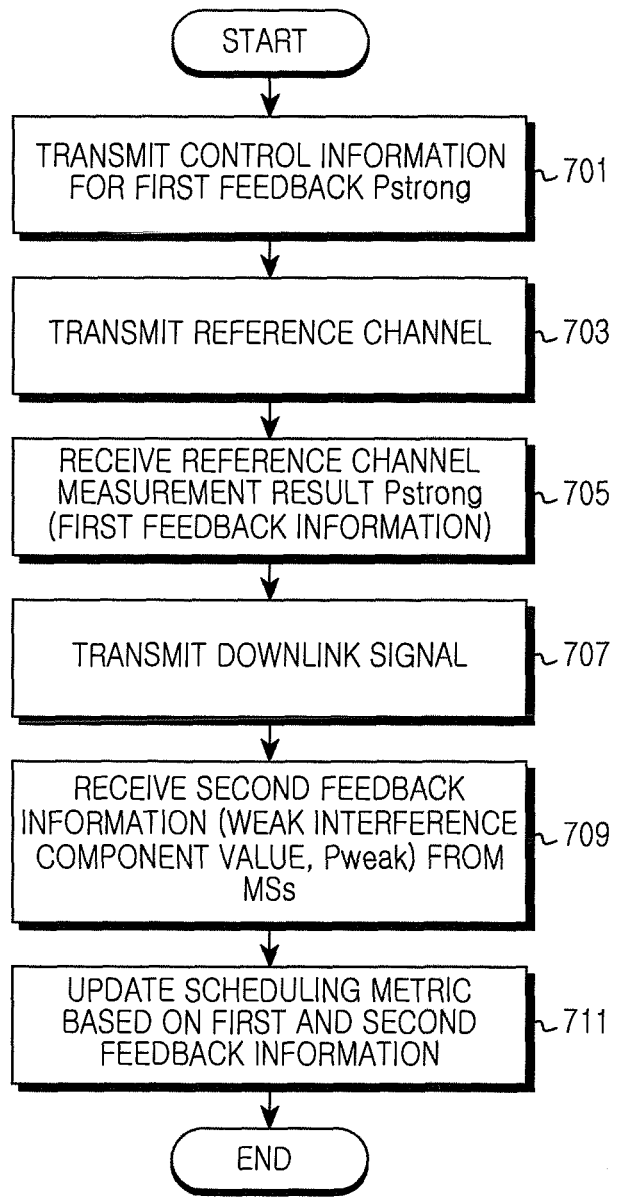
FIG. 7 illustrates operations of the base station according to an embodiment of the present disclosure.
Figure 8:
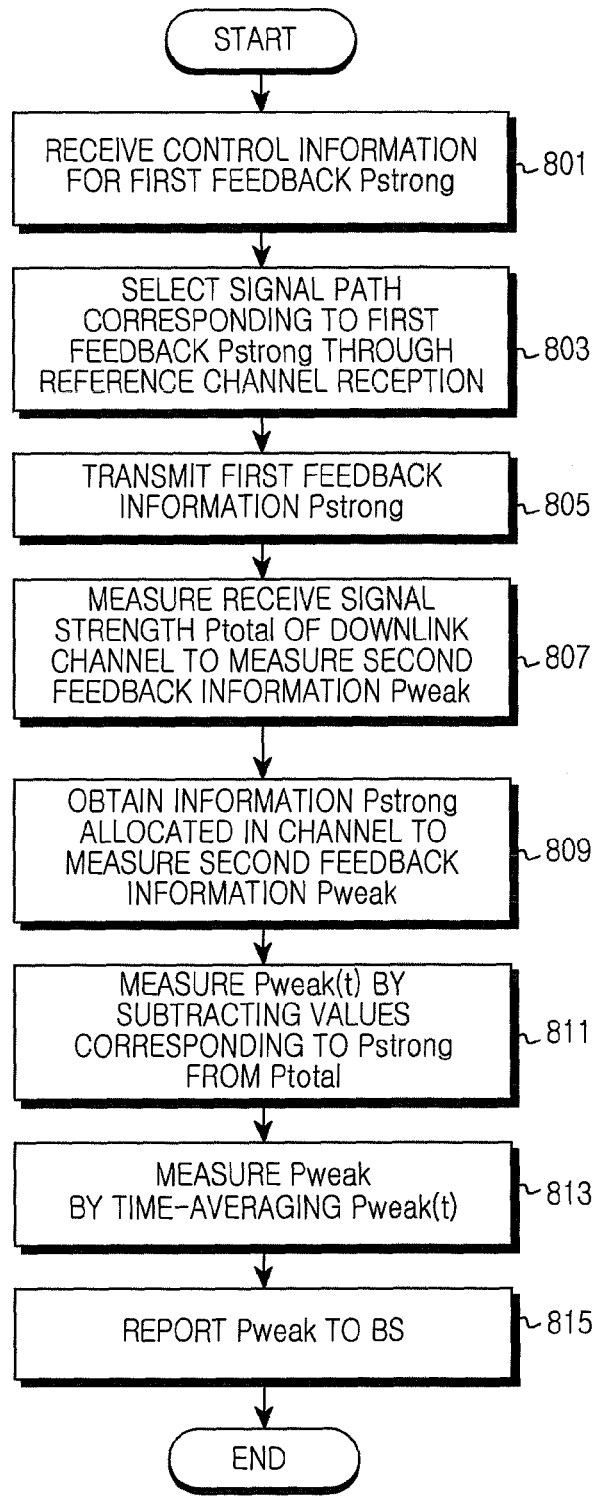
FIG. 8 illustrates operations of the mobile station according to an embodiment of the present disclosure.
Figure 9:
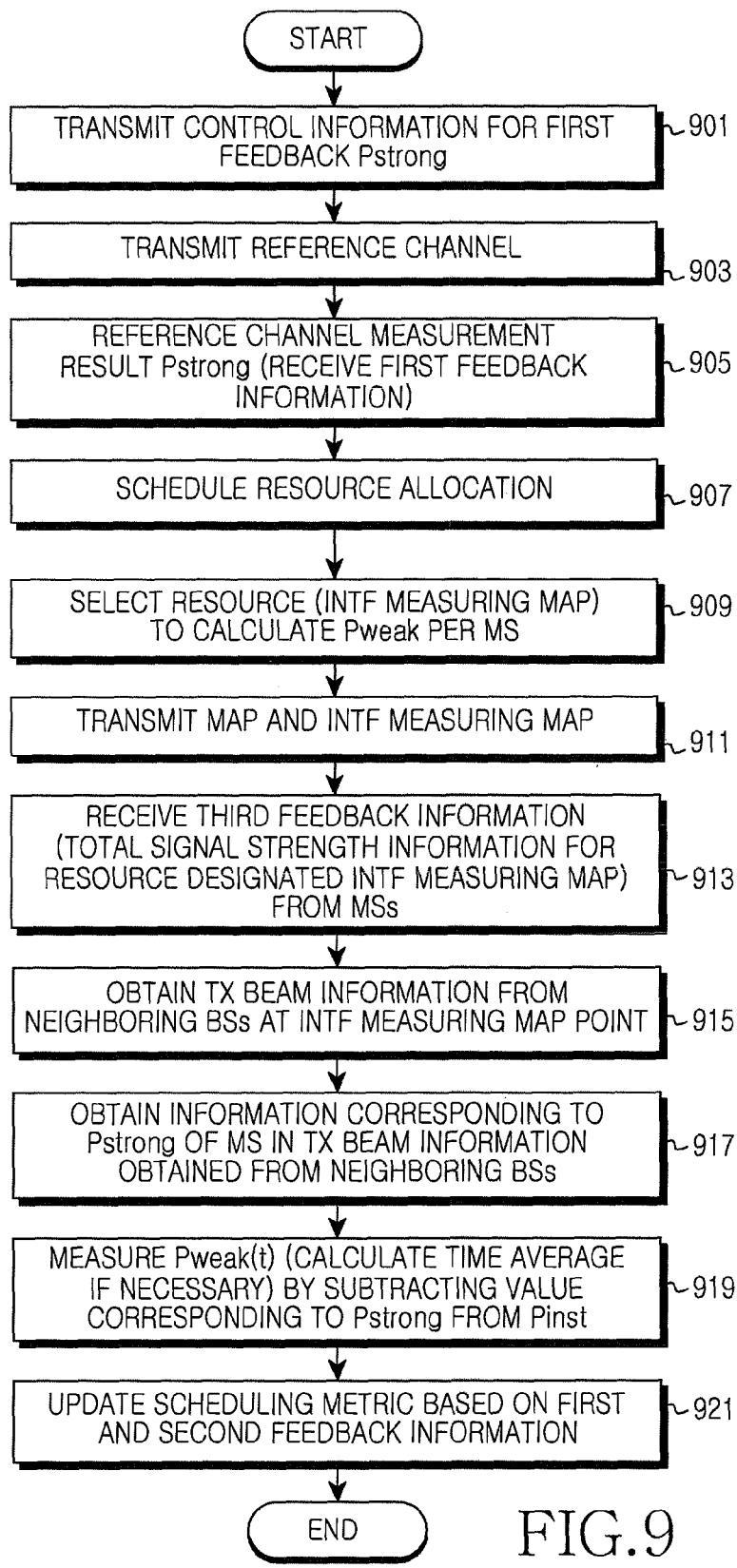
FIG. 9 illustrates operations of the base station according to another embodiment of the present disclosure.
Figure 10:
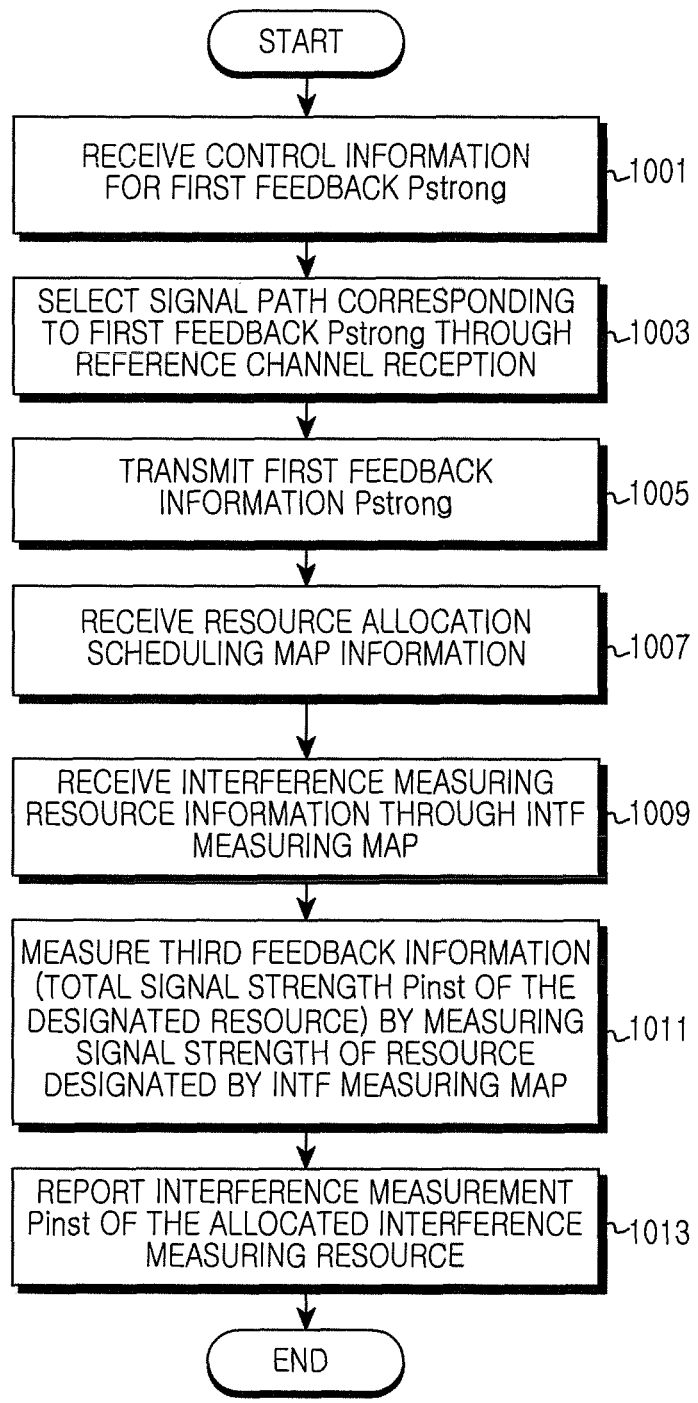
FIG. 10 illustrates operations of the mobile station according to another embodiment of the present disclosure.

FIGS. 7 and 8 depict the operations of the BS and the MS according to an embodiment of the present disclosure. FIGS. 9 and 10 depict the operations of the BS and the MS according to another embodiment of the present disclosure.

FIG. 7 is a flowchart of the operations of the BS when the MS directly measures and transmits to the BS the second feedback information Pweak in addition to the first feedback information Pstrong. While the same operations can be applied to BSs 101, 102, and 103 of FIG. 1, BS 101 alone is exemplified to ease the understanding.

In operation 701, the BS transmits to the MS or the MS groups the threshold of the first feedback information Pstrong or the number information N of Pstrong as the first feedback control information, so that each MS can determine whether to set Pstrong for the signal paths (the combination of the TX beam and the RX beam).

In operation 703, the BS transmits the reference channel signal for each signal path over the reference channel. The reference signals for the respective signal paths can be used by the MS to measure the signal path strength. Based on the measured signal path strength, the MS can determine whether the signal path belongs to Pstrong. The MSs report the first feedback information Pstrong including the information of Table 1, to the BS.

In operation 705, the BS receives the signal Pstrong being the first feedback information from the MSs. The corresponding information is shown in Table 1. In further detail, the corresponding information can include the TX BS (cell/sector) ID of a particular signal path, the corresponding TX beam ID of the corresponding TX BS, the RX beam ID used by the MS to receive the beam, and the receive strength measured by the MS in the corresponding path. Based on those values, the BS can predict the SINR of the MSs in the CoMP and perform the scheduling.

In operation 707, the BS transmits the downlink signal. The downlink signal may reuse the existing reference signal of operation 703, or use a separate reference channel or data channel. Since the multiple BSs transmit the signal in operation 707, one or more BS downlink signals are overlapping. When the signals are the reference channel in operation 707, they can include the information (sequence) about the beams and the MSs can determine using the signals whether the corresponding signals transmitted include the TX beam corresponding to Pstrong. By contrast, when the signals of operation 707 do not include the beam information (sequence), the BS transmits the beam information of the corresponding signal to the MS in advance or later so that the MSs can obtain the corresponding beam components and exclude the receive strength of the TX beams corresponding to Pstrong from the total receive signal strength.

As the MSs transmit the designated signal Pweak after operation 707, the BS receives the second feedback information Pweak from the MSs in operation 709.

In operation 711, the BS can obtain all of the values for Equation 3 from the first feedback information Pstrong received in operation 705 and the second feedback information Pweak received in operation 709, and thus predict the SINR of the MS. Hence, in the CoMP, the BSs can predict the SINR of the MSs, schedule the MSs, and determine the MCS based on the SINR.

FIG. 8 is a flowchart of the operations of the MS when the MS directly measures and reports the second feedback information Pweak to the BS in addition to the first feedback information Pstrong.

In operation 801, the MS receives the control information for the first feedback information Pstrong. The corresponding control information can include the particular threshold information or the particular number information N for determining the first feedback information Pstrong. The MS stores the control information to determine whether the signal paths are Pstrong.

In operation 803, the MS selects the signal path corresponding to the first feedback information Pstrong through the reference channel reception. In so doing, by use of the first feedback information received in operation 801, the MS sets Pstrong of the N-ary signal paths exceeding the receive strength threshold or having the great signal strength in descending order.

In operation 805, the MS transmits the signal Pstrong set in operation 803, as the first feedback information, to the BS. The first feedback information includes the TX BS (cell/sector) ID of the particular signal path, the corresponding TX beam ID of the corresponding TX BS, the RX beam ID used by the MS to receive the beam, and the receive strength measured by the MS in the corresponding path as shown in Table 1.

In operation 807, the MS measures the receive signal strength Ptotal of the downlink channel to measure the second feedback information Pweak. In so doing, to identify the TX beams of the BSs of the corresponding signal, the MS may try to decode the sequence including the beam information in the corresponding signal. When the MS cannot decode the sequence of the TX beam information of the BSs in the corresponding signal, the MS may obtain the beam information of the corresponding signal by separately receiving the beam information from the BS in advance or later.

In operation 809, the MS identifies the signals corresponding to Pstrong of the corresponding MS in the TX beam information of the BSs and calculates the sum of the receive signal strengths allocated of the information. Pstrong reported in operation 805.

In operation 811, the MS measures Pweak(t) of the corresponding point by subtracting the sum of the signals Pstrong allocated in operation 809 from the receive strength Ptotal of the corresponding downlink channel measured in operation 807.

In operation 813, the MS measures the time average Pweak by time-averaging Pweak(t) of the points calculated in operation 811.

In operation 815, the MS transmits Pweak of the points calculated in operation 813, as the second feedback information, to the BS.

FIG. 9 is a flowchart of the operations of the BS when the MS transmits the third feedback information Pinst after the first feedback information Pstrong and the BS directly calculates Pweak. While the same operations can be applied to BSs 101, 102, and 103 of FIG. 1, BS 101 alone is exemplified to ease the understanding.

In operation 901, the BS transmits to the MS or the MS groups the threshold of the first feedback information Pstrong or the number information N of Pstrong as the first feedback control information, so that each MS can determine whether to set Pstrong for the signal paths (the combination of the TX beam and the RX beam).

In operation 903, the BS transmits the reference channel signal for each signal path over the reference channel. The reference signals for the respective signal paths can be used by the MS to measure the signal path strength. Based on the measured signal path strength, the MS can determine whether the signal path belongs to Pstrong. The MSs report the first feedback information Pstrong including the information of Table 1, to the BS.

In operation 905, the BS receives the signal Pstrong being the first feedback information from the MSs. The corresponding information is shown in Table 1. Specifically, the corresponding information can include the TX BS (cell/sector) ID of a particular signal path, the corresponding TX beam ID of the corresponding TX BS, the RX beam ID used by the MS to receive the beam, and the receive strength measured by the MS in the corresponding path. Based on those values, the BS can predict the SINR of the MSs in the CoMP and perform the scheduling.

In operation 907, the BS determines the resource allocation scheduling for the MSs based on the information.

In operation 909, the BS selects the adequate resource to calculate Pweak of the particular MS or MS group using the resource allocation scheduling result determined in operation 907.

In operation 911, the BS transmits the MAP information determined in operation 907 and the INTF measuring MAP information indicating the designated resource for calculating Pweak of the MS or MS group in operation 909. The INTF measuring MAP indicates the resource for measuring the total signal receive strength for the MSs receiving the INTF measuring MAP. The INTF measuring MAP signal includes the information of the MS or the MS group for measuring the INTF, and the information of the resource location to be measured by the corresponding MS or MS group. In addition, when the MSs apply the RX beamforming, the INTF measuring MAP signal may include the direction/pattern of the RX beamforming to be used by the corresponding MS to measure the sum of the corresponding interference signals.

When the MSs measure and report the receive signal strength of the resource designated by the INTF measuring MAP in operation 911, the BS receives the third feedback information Pinst which is the resource receive strength corresponding to the INTF measuring MAP from the MSs in operation 913.

In operation 915, the BS obtains the beam information transmitted from the BSs with respect to the resource designated by the INTF measuring MAP through the signal exchange with the neighboring BSs.

In operation 917, the BS separates the signals Pstrong of the MSs and calculates their sum based on the TX beam information of the neighboring BSs for the resource designated by the INTF measuring MAP obtained in operation 915.

In operation 919, the BS calculates Pweak(t) of the corresponding point by subtracting the sum of the values Pstrong of the TX beam information of the BSs obtained in operation 917, from the third feedback information Pinst of the MS, and measures Pweak, if necessary, by converting it to the time average.

In operation 921, the BS can obtain all of the values for Equation 3 from the first feedback information Pstrong obtained in operation 905 and Pweak obtained in operation 919, and thus predict the SINR of the MSs. Hence, in the CoMP, the BSs can predict the SINR of the MSs, and schedule the MSs and determine the MCS based on the SINR.

FIG. 10 is a flowchart of the operations of the MS when the MS transmits the third feedback information Pinst after the first feedback information Pstrong and the BS directly calculates Pweak.

In operation 1001, the MS receives the control information for the first feedback information Pstrong. The corresponding control information can include the particular threshold information or the particular number information N for determining the first feedback information Pstrong. The MS stores the control information to determine whether the signal paths are Pstrong.

In operation 1003, the MS selects the signal path corresponding to the first feedback information Pstrong through the reference channel reception. In so doing, by use of the first feedback information received in operation 1001, the MS sets Pstrong of the N-ary signal paths exceeding the receive strength threshold or having the great signal strength in descending order.

In operation 1005, the MS transmits the signal Pstrong set in operation 1003, as the first feedback information, to the BS. The first feedback information includes the TX BS (cell/sector) ID of the particular signal path, the corresponding TX beam ID of the corresponding transmit BS, the RX beam ID used by the MS to receive the beam, and the receive strength measured by the MS in the corresponding path as shown in Table 1.

The MS receives resource allocation scheduling MAP information from the BS in operation 1007, and obtains INTF measuring resource information by receiving the INTF measuring MAP information from the BS in operation 1009.

In operation 1011, the MS measures the receive signal strength of the designated resource obtained in operation 1009 and generates the third feedback information Pinst as the measurement result.

In operation 1013, the MS transmits to the BS the third feedback information Pinst which is the signal strength information measured in operation 1011 with respect to the designated resource obtained in operation 1009.

Figure 11:
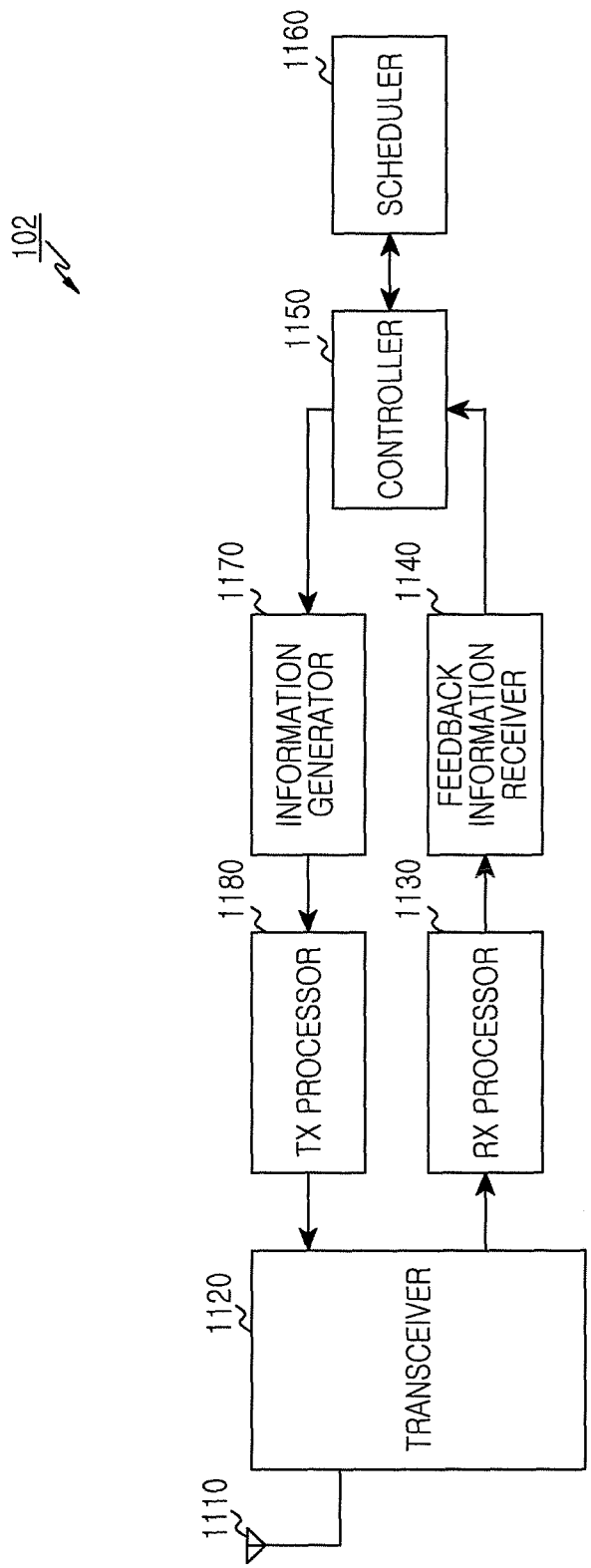
FIG. 11 illustrates the base station according to an embodiment of the present disclosure.

FIG. 11 is a block diagram of the BS according to an embodiment of the present disclosure. While BS 102 of FIG. 1 is illustrated here, the present disclosure is not limited to BS 102. Herein, the structure of BS 102 is depicted in view of the functions according to embodiments of the present disclosure. It is noted that the BS can be depicted in a different structure with the same functions and can include other components.

BS 102 includes an antenna 1110, a transceiver 1120, an RX processor 1130, a feedback information receiver 1140, a controller 1150, a scheduler 1160, an information generator 1170, and a TX processor 1180. The antenna 1110 supports the beamforming, receives the signal from MS 116, and transmits the signal to MS 116. The transceiver 1120 processes TX information to a signal for the transmission and outputs the signal to the antenna 1110. The transceiver 1120 inputs a baseband or Intermediate Frequency (IF) signal output from the TX processor 1180, and up-converts the baseband or IF signal to a Radio Frequency (RF) signal. The TX processor 1180 generates the baseband or IF signal by encoding and multiplexing the TX information generated by the information generator 1170. The information generator 1170 generates reference channel/synchronization channel information as the channel for measuring the RX beam in the MS. The information generator 1170 generates the information (N or threshold) to be used by MS 116 to generate the first feedback information. The information (N or threshold) is the information for selecting part of the downlink paths between BSs 101, 102, and 103 and MS 116. The selected paths can include a preset number of paths having a good receive signal strength among the plurality of the downlink paths, or paths having a receive signal strength greater than a preset threshold among the plurality of the downlink paths.

The transceiver 1120 processes the signal received via the antenna 1110. The transceiver 1120 converts the RF signal received via the antenna 1110 to the baseband or IF signal. The RX processor 1130 generates the baseband signal by filtering and decoding the baseband or IF signal output from the transceiver 1120. The feedback information receiver 1140 receives the first feedback information from MS 116. The feedback information receiver 1140 receives from MS 116 the second feedback information including the interference measurement result of the TX resource region for measuring the interference based on the first feedback information.

The controller 1150 can be realized by one or more microprocessors. The controller 1150 controls to receive and process the feedback information for the scheduling from the MS. A memory (not shown) can be coupled to the controller 1150. The memory can store information relating to the processing flow of the operations. The scheduler 1160 is coupled to the controller 1150. Under the control of the controller 1150, the scheduler 1160 generates the scheduling information MAP, allocates (designates) the TX resource for the MS, generates the INTF measuring MAP, and updates a scheduling metric. More specifically, the scheduler 1160 generates the scheduling information based on the first feedback information from MS 116, designates the TX resource for the interference measurement of MS 116, and calculates the SINR of MS 116 based on the first feedback information and the second feedback information.

The first feedback information includes the receive signal strength measurement result Pstrong in the selected paths of the downlink paths between BSs 101, 102, and 103 and the MS 116.

The second feedback information includes the interference measurement result in the designated TX resource region. According to an embodiment of the present disclosure, the second feedback information can include the total interference Pinst between BSs 101, 102, and 103 and MS 116 in the designated TX resource region. In this case, the designated TX resource region can include the resource other than the signal TX resource for MS 116, or the signal TX resource for the other MSs than MS 116. According to another embodiment of the present disclosure, the second feedback information can include the weak interference component Pweak(t) in the designated TX resource region. In this case, the designated TX resource region can include the signal TX resource for MS 116.

Figure 12:
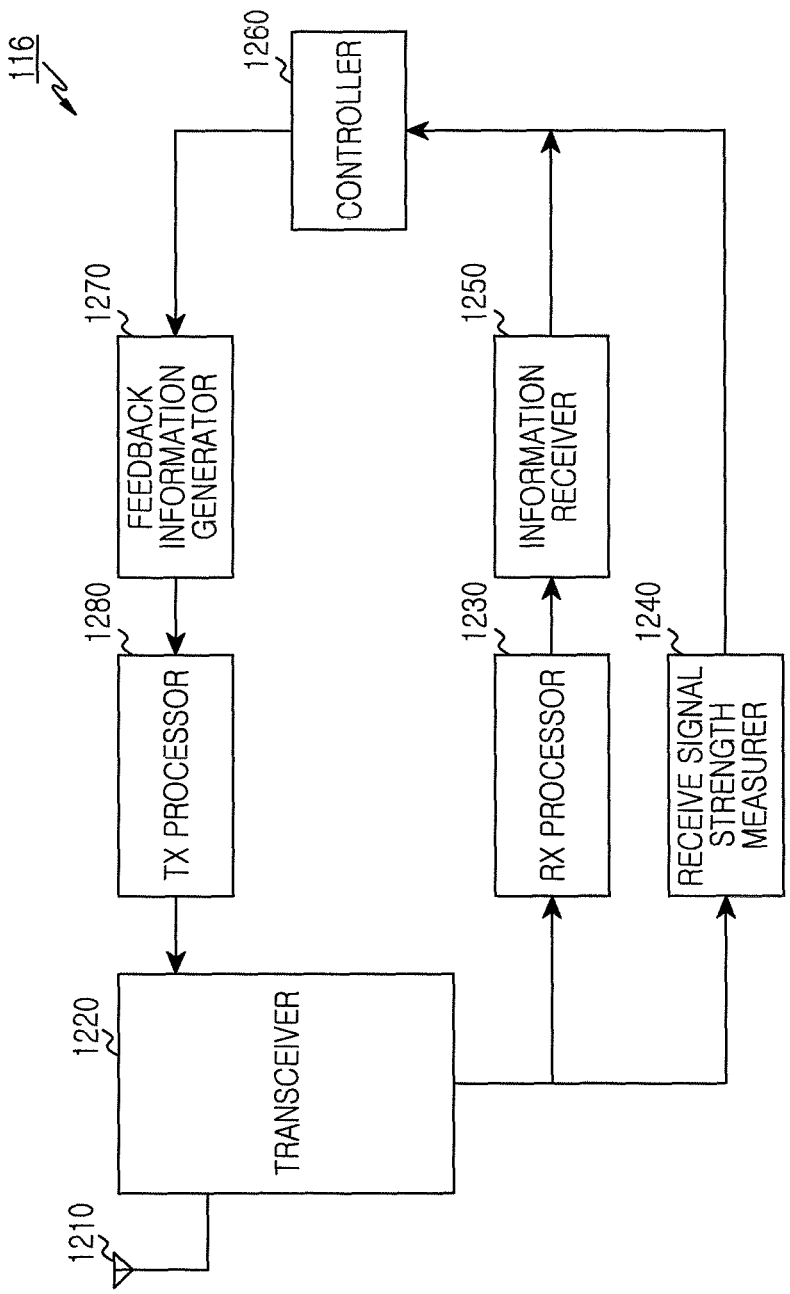
FIG. 12 illustrates the mobile station according to an embodiment of the present disclosure.

FIG. 12 is a block diagram of the MS according to an embodiment of the present disclosure. While MS 116 of FIG. 1 is illustrated here, the present disclosure is not limited to MS 116. Herein, the structure of MS 116 is depicted in view of the functions according to embodiments of the present disclosure. It is noted that the MS can be depicted in a different structure with the same functions and can include other components.

MS 116 includes an antenna 1210, a transceiver 1220, a RX processor 1230, a receive signal strength measurer 1240, an information receiver 1250, a controller 1260, a feedback information generator 1270, and a TX processor 1280. The antenna 1210 supports the beamforming, receives the signals from BSs 101, 102, and 103, and transmits the signal to BSs 101, 102, and 103. The transceiver 1220 processes the signal received via the antenna 1210. The transceiver 1220 converts the RF signal received via the antenna 1210 to the baseband or IF signal. The RX processor 1230 generates the baseband signal by filtering and decoding the baseband or IF signal output from the transceiver 1220. The receive signal strength measurer 1240 measures the receive signal strength in the downlink paths between BSs 101, 102, and 103 and MS 116. The information receiver 1250 receives the information (N or threshold) from the BS 102. The information (N or threshold) is the information for selecting part of the downlink paths between B Ss 101, 102, and 103 and MS 116. The information receiver 1250 receives the scheduling information MAP generated by BS 120 and the INTF measuring MAP.

The transceiver 1220 processes TX information to a signal for the transmission and outputs the signal to the antenna 1210. The transceiver 1220 inputs a baseband or IF signal output from the TX processor 1280, and up-converts the baseband or IF signal to the RF signal. The TX processor 1280 generates the baseband or IF signal by encoding and multiplexing the feedback information generated by the feedback information generator 1270. The feedback information generator 1270 generates the first feedback information and the second feedback information under control of the controller 1260.

The first feedback information includes the receive signal strength measurement result Pstrong in the selected paths of the downlink paths between BSs 101, 102, and 103 and MS 116. When generating the first feedback information, MS 116 generates the first feedback information including the receive signal strength measurement result in the selected paths of the downlink paths between BSs 101, 102, and 103 and MS 116, based on the information (N or threshold) provided from BS 102. The selected paths can include a preset number of paths having a good receive signal strength among the plurality of downlink paths, or paths having a receive signal strength greater than a preset threshold among the plurality of the downlink paths.

The second feedback information includes the interference measurement result in the designated TX resource region. According to an embodiment of the present disclosure, the second feedback information can include the total interference Pinst between BSs 101, 102, and 103 and MS 116 in the designated TX resource region. In this case, the designated TX resource region can include the resource other than the signal TX resource for MS 116, or the signal TX resource for the other MSs than MS 116. According to another embodiment of the present disclosure, the second feedback information can include the weak interference component Pweak(t) in the designated TX resource region.

The controller 1260 can be realized by one or more microprocessors. The controller 1260 controls to generate and transmit to the BS the feedback information for the scheduling. A memory (not shown) can be coupled to the controller 1260. The memory can store information relating to the processing flow of the operations.

Unlike the related art where the MS measures and feeds back the SINR and the particular interference, the MS reports the signal strength based on the TX/RX beam combination of the BSs and the weak interference in the designated resource region as the feedback information, and the BS predicts the SINR of the MS based on the reported feedback information. Even when the dynamic range of the signal strength and the interference strength is considerable in the wireless communication system using the beamforming, the present disclosure can predict the SINR on the frame basis and fulfill the reliable scheduling based on the SINR.

A number of examples have been described above. However, it will be understood that various modifications may be made. For example, while the components of the BS and the MS of FIG. 11 and FIG. 12 realize the present disclosure, a single processor can realize the operations of the present disclosure. In this case, program instructions for carrying out various operations executed by a computer can be recorded in a computer-readable medium. The computer-readable medium can include, alone or in combination, the program instructions, data files, data structures, and the like. The program instructions may be designed and constructed especially for the implementations of the present disclosure, or well known to those skilled in the art. Examples of computer-readable storage medium include magnetic media, such as hard disks, floppy disks, and magnetic tape; optical media such as CD ROM disks and DVDs; magneto-optical media, such as optical disks; and hardware devices specially configured to store and execute program instructions, such as read-only memory (ROM), random access memory (RAM), flash memory, and the like. Examples of program instructions include machine code, such as produced by a compiler, and high-level language code executed by the computer using an interpreter. When all or part of the BS or the relay is implemented as a computer program, the present disclosure can include the computer-readable recording medium storing the computer program.

While the disclosure has been shown and described with reference to certain example embodiments thereof, it will be understood by those skilled in the art that various changes in form and details may be made therein without departing from the spirit and scope of the disclosure as defined by the appended claims and their equivalents.

What is claimed is:

1. A method for operating a base station (BS) in a wireless communication system, the method comprising:
receiving, from a mobile station (MS), first feedback information comprising a strength measurement for received signals in one or more paths selected from a plurality of downlink paths;
allocating a resource for interference measurement of the MS based on the first feedback information;

receiving, from the MS, second feedback information comprising an interference measurement result in the allocated resource; and identifying a signal to interference plus noise ratio (SINR) of the MS based on the first feedback information and the second feedback information, wherein the allocated resource comprises a resource other than a resource for transmitting signals to the MS.

2. The method of claim 1, further comprising:

generating scheduling information based on the first feedback information and transmitting the generated scheduling information to the MS.

3. The method of claim 2, wherein the first feedback information comprises a BS identifier (ID), a transmission (TX), beam ID, and a receiving (RX) beam ID indicating RX beam use of the MS in the BS.

4. The method of claim 1, wherein the SINR is identified in accordance with the following equation:

$$SINR = \frac{Pstrong_{desired}}{\sum_s Pstrong + Pweak + Pn}$$

where $Pstrong_{desired}$ denotes a receive signal strength corresponding to a TX beam from the BS to the MS, which is selected from the receive signal strengths of the selected paths for allocation at a particular TX point, $$\sum_s Pstrong$$

denotes a strong interference component corresponding to a sum of the receive signal strengths corresponding to the TX beam selected from neighboring BSs of the BS for allocation, in the receive signal strengths of the selected paths excluding the selected TX beam, Pweak denotes a total receive signal strength of the MS for the allocated resource affected by a strong interference component, and Pn denotes a mobile station (MS) for operating a mobile station (MS) in a wireless communication system, the method comprising:

transmitting, to a base station (BS), first feedback information comprising a strength measurement for received signals in one or more paths selected from a plurality of downlink paths between the BSs and the MS;

receiving a resource for interference measurement allocated by the BS based on the first feedback information; and transmitting, to the BS, second feedback information comprising an interference measurement in the allocated resource so that the BS identifies a signal to interference plus noise ratio (SINR) based on the first feedback information and the second feedback information, wherein the allocated resource comprises a resource other than a resource for transmitting signals to the MS.

5. The method of claim 4, wherein the second feedback information comprises information about a total receive signal strength of the MS for the allocated TX resource, $$Pweak(t) = Pinst(t) - \sum_s Pstrong(t)$$

where Pinst(t) denotes a total receive signal strength of the MS for a corresponding resource.

6. The method of claim 4, wherein the second feedback information comprises a weak interference component identified in the allocated TX resource region based on the following equation:

$$Pweak(t) = Ptotal(t) - \sum_s Pstrong(t)$$

where Ptotal(t) denotes the total receive strength of the MS at a particular point, and $$\sum_s Pstrong(t)$$

denotes the sum of the receive signal strengths of the TX beam allocated at the particular point.

7. A method of a mobile station (MS) for operating a mobile station (MS) in a wireless communication system, the method comprising:

transmitting, to a base station (BS), first feedback information comprising a strength measurement for received signals in one or more paths selected from a plurality of downlink paths between the BSs and the MS;

receiving a resource for interference measurement allocated by the BS based on the first feedback information; and transmitting, to the BS, second feedback information comprising an interference measurement in the allocated resource so that the BS identifies a signal to interference plus noise ratio (SINR) based on the first feedback information and the second feedback information, wherein the allocated resource comprises a resource other than a resource for transmitting signals to the MS.

8. The method of claim 7, further comprising:

receiving scheduling information generated from the BS based on the first feedback information.

9. The method of claim 8, wherein the first feedback information comprises a BS ID, a TX beam ID, and a RX beam ID indicating RX beam use of the MS in the BS.

10. The method of claim 7, wherein the SINR is identified in accordance with the following equation:

$$SINR = \frac{Pstrong_{desired}}{\sum_s Pstrong + Pweak + Pn}$$

where $Pstrong_{desired}$ denotes a receive signal strength corresponding to a TX beam from the BS to the MS, which is selected from the receive signal strengths of the selected paths for allocation at a particular TX point, $$\sum_s Pstrong$$

denotes a strong interference component corresponding to a sum of the receive signal strengths corresponding to the TX beam selected from neighboring BSs of the BS for allocation, in the receive signal strengths of the selected paths excluding the selected TX beam, Pweak denotes a total receive signal strength of the MS for the allocated resource affected by a strong interference component, and Pn denotes a noise power.

11. The method of claim 10, wherein the second feedback information comprises information about a total receive signal strength of the MS for the allocated TX resource, $$Pweak(t) = Pinst(t) - \sum_s Pstrong(t)$$

where Pinst(t) denotes a total receive signal strength of the MS for a corresponding resource.

12. The method of claim 10, wherein the second feedback information comprises a weak interference component identified in the allocated TX resource region based on the following equation:

$$Pweak(t) = Ptotal(t) - \sum_s Pstrong(t)$$

where Ptotal(t) denotes the total receive strength of the MS at a particular point, and $$\sum_s Pstrong(t)$$

denotes the sum of the receive signal strengths of the TX beam allocated at the particular point.

13. An apparatus of a base station (BS) in a wireless communication system, the apparatus comprising:
a feedback information receiver configured to receive, from a mobile station (MS), first feedback information comprising a strength measurement for received signals in one or more paths selected from a plurality of downlink paths, and second feedback information comprising an interference measurement in an allocated resource region; and
a scheduler configured to allocate a resource for interference measurement of the MS based on the first feedback information, and identify a signal to interference plus noise ratio (SINR) of the MS based on the first feedback information and the second feedback information,
wherein the allocated resource comprises a resource other than a resource for transmitting signals to the MS.

14. The apparatus of claim 13, wherein the scheduler generates scheduling information based on the first feedback information, the apparatus further comprising:
a transmitter configured to transmit the generated scheduling information to the MS.

15. The apparatus of claim 14, wherein the first feedback information comprises a BS ID, a TX beam ID, and a RX beam ID indicating RX beam use of the MS in the BS.

16. The apparatus of claim 13, wherein the SINR is identified in accordance with the following equation:

$$SINR = \frac{Pstrong_{desired}}{\sum_s Pstrong + Pweak + Pn}$$

where $Pstrong_{desired}$ denotes a receive signal strength corresponding to a TX beam from the BS to the MS, which is selected from the receive signal strengths of the selected paths for allocation at a particular TX point, $$\sum_s Pstrong$$

denotes a strong interference component corresponding to a sum of the receive signal strengths corresponding to the TX beam selected from neighboring BSs of the BS for allocation, in the receive signal strengths of the selected paths excluding the selected TX beam, Pweak denotes a total receive signal strength of the MS for the allocated resource affected by a strong interference component, and Pn denotes a noise power.

17. The apparatus of claim 16, wherein the second feedback information comprises information about a total receive signal strength of the MS for the allocated TX resource, $$Pweak(t) = Pinst(t) - \sum_s Pstrong(t)$$

where Pinst(t) denotes a total receive signal strength of the MS for a corresponding resource.

18. The apparatus of claim 16, wherein the second feedback information comprises a weak interference component identified in the allocated TX resource region based on the following equation:

$$Pweak(t) = Ptotal(t) - \sum_s Pstrong(t)$$

where Ptotal(t) denotes the total receive strength of the MS at a particular point, and $$\sum_s Pstrong(t)$$

denotes the sum of the receive signal strengths of the TX beam allocated at the particular point.

19. An apparatus of a mobile station (MS) in a wireless communication system, the apparatus comprising:
a receive signal strength measurer configured to measure a signal strength for received signals in one or more paths selected from a plurality of downlink paths;
an information transmitter configured to receive a resource allocated by a base station BS for interference measurement of the MS based on a first feedback information comprising the strength measurement for received signals; and a transmitter configured to transmit, to the BS, the first feedback information and second feedback information comprising an interference measurement result in the allocated resource so that the BS identifies a signal to interference plus noise ratio (SINR) of the MS based on the first feedback information and the second feedback information, wherein the allocated resource comprises a resource other than a resource for transmitting signals to the MS.

20. The apparatus of claim 19, wherein the information receiver receives scheduling information generated from the BS based on the first feedback information.

21. The apparatus of claim 20, wherein the first feedback information comprises a BS ID, a TX beam ID, and a RX beam ID indicating RX beam use of the MS in the BS.

22. The apparatus of claim 20, wherein the SINR is identified in accordance with the following equation:

$$SINR = \frac{Pstrong_{desired}}{\sum_s Pstrong + Pweak + Pn}$$

where $Pstrong_{desired}$ denotes a receive signal strength corresponding to a TX beam from the BS to the MS, which is selected from the receive signal strengths of the selected paths for allocation at a particular TX point, $$\sum_s Pstrong$$

denotes a strong interference component corresponding to a sum of the receive signal strengths corresponding to the TX beam selected from neighboring BSs of the BS for allocation, in the receive signal strengths of the selected paths excluding the selected TX beam, Pweak denotes a total receive signal strength of the MS for the allocated resource affected by a strong interference component, and Pn denotes a noise power.

23. The apparatus of claim 22, wherein the second feedback information comprises information about a total receive signal strength of the MS for the allocated TX resource, $$Pweak(t) = Pinst(t) - \sum_s Pstrong(t)$$

where Pinst(t) denotes a total receive signal strength of the MS for a corresponding resource.

24. The apparatus of claim 22, wherein the second feedback information comprises a weak interference component calculated in the allocated TX resource region based on the following equation:

$$Pweak(t) = Ptotal(t) - \sum_s Pstrong(t)$$

where Ptotal(t) denotes the total receive strength of the MS at a particular point, and $$\sum_s Pstrong(t)$$

denotes the sum of the receive signal strengths of the TX beam allocated at the particular point.

* * * * *